US012749020B2

(12) United States Patent
Sengupta et al.

(10) Patent No.: US 12,749,020 B2
(45) Date of Patent: Sep. 29, 2026

(54) REINFORCEMENT LEARNING FOR MACHINE LEARNING MODELS USING DYNAMIC CONFIDENCE THRESHOLDS

(71) Applicant: Optum, Inc., Minnetonka, MN (US)

(72) Inventors: Ayan Sengupta, Noida (IN); Sudhanshu Sharma, Bangalore (IN); Julie Zhu, Maple Grove, MN (US); Elizabeth Patterson Cohn, Raleigh, NC (US)

(73) Assignee: OPTUM, INC., Minnetonka, MN (US)

( * ) Notice: Subject to any disclaimer, the term of this patent is extended or adjusted under 35 U.S.C. 154(b) by 387 days.

(21) Appl. No.: 18/508,680

(22) Filed: Nov. 14, 2023

(65) Prior Publication Data

US 2025/0156750 A1 May 15, 2025

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 11,295,242 B2 4/2022 Chang et al.
11,341,367 B1 5/2022 Barbosa et al.
11,416,772 B2 8/2022 Wang et al.
12,056,579 B1 * 8/2024 Mattar ................... G06N 20/00
2019/0172082 A1 * 6/2019 Ganti Mahapatruni . G06N 5/01
2020/0074504 A1 * 3/2020 Cao .......................... G06N 7/01
2021/0065034 A1 * 3/2021 Diehl .................. H04L 41/0686
2021/0097350 A1 * 4/2021 Theocharous ........... G06N 5/04
2021/0158177 A1 * 5/2021 Sancheti ................ G06N 3/006
2022/0043850 A1 2/2022 Mishra et al.
2022/0366280 A1 11/2022 Rowe et al.
2024/0232698 A1 * 7/2024 Das ........................ G06N 20/00

FOREIGN PATENT DOCUMENTS

WO 2019/075771 A1 4/2019

OTHER PUBLICATIONS

Gomes, Heitor, et al., "A Survey on Semi-supervised Learning for Delayed Partially Labelled Data Streams", ACM Computing Surveys, vol. 55, No. 4, Article 75, Nov. 2022, (42 pages), doi.org/10.1145/3523055.

* cited by examiner

*Primary Examiner* — Ryan Barrett
(74) *Attorney, Agent, or Firm* — Alston & Bird LLP

(57) ABSTRACT

Various embodiments of the present disclosure provide reinforcement learning for machine learning using dynamic confidence thresholds. In one example, an embodiment provides for generating a plurality of training datasets for a machine learning model by augmenting a labeled dataset for the machine learning model with a synthetic labeled dataset, generating a plurality of retrained model versions of the machine learning model based on the plurality of training datasets, generating a reward indicator for a retrained model version of the plurality of retrained versions of the machine learning model based on a comparison between a validation dataset for the machine learning model and a respective output dataset for the retrained model version, and modifying the defined confidence threshold based on the reward indicator for the retrained model version to generate a modified confidence threshold for the machine learning model.

20 Claims, 9 Drawing Sheets

600

REINFORCEMENT LEARNING FOR MACHINE LEARNING MODELS USING DYNAMIC CONFIDENCE THRESHOLDS

BACKGROUND

Various embodiments of the present disclosure address technical challenges related to performing machine learning data analysis in a computationally accurate, efficient, and/or consistent manner. Existing machine learning data analysis systems are ill-suited to accurately, efficiently, and/or consistently perform predictive data analysis in various domains, such as domains that are associated with high-dimensional categorical feature spaces with a high degree of cardinality. Various embodiments of the present disclosure make important contributions to traditional machine learning data analysis techniques by addressing these technical challenges, among others.

BRIEF SUMMARY

In general, various embodiments of the present disclosure provide machine learning data manipulation, training, and prediction techniques that enable improved reinforcement learning for machine learning models using intelligently and dynamically defined confidence thresholds. For example, some techniques of the present disclosure determine dynamic confidence thresholds using multi-armed bandit modeling with respect to a reward indicator for a retrained version of a machine learning model. In this manner, some embodiments of the present disclosure improve upon traditional machine learning systems by enabling accurate, efficient, and/or consistent training for a machine learning model via reinforcement learning. In this manner, some of the techniques of the present disclosure enable the generation, use, and evaluation of machine learning models with reduced computing resources that generate more accurate predictions through improved learning quality assurance techniques as compared to traditional machine learning systems.

In some embodiments, a computer-implemented method includes generating, by one or more processors, a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold. In some embodiments, the computer-implemented method additionally or alternatively includes generating, by the one or more processors, a plurality of retrained model versions of the machine learning model based on the plurality of training datasets. In some embodiments, the computer-implemented method additionally or alternatively includes generating, by the one or more processors, a reward indicator for a retrained model version of the plurality of retrained versions of the machine learning model based on a comparison between a validation dataset for the machine learning model and a respective output dataset for the retrained model version. In some embodiments, the computer-implemented method additionally or alternatively includes modifying, by the one or more processors and using a multi-armed bandit model, the defined confidence threshold based on the reward indicator for the retrained model version to generate a modified confidence threshold for the machine learning model. In some embodiments, the computer-implemented method additionally or alternatively includes initiating, by the one or more processors, the performance of the machine learning model based on the modified confidence threshold.

In some embodiments, a computing system includes memory and one or more processors communicatively coupled to the memory. In some embodiments, the one or more processors are configured to generate a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold. In some embodiments, the one or more processors are additionally or alternatively configured to generate a plurality of retrained model versions of the machine learning model based on the plurality of training datasets. In some embodiments, the one or more processors are additionally or alternatively configured to generate a reward indicator for a retrained model version of the plurality of retrained versions of the machine learning model based on a comparison between a validation dataset for the machine learning model and a respective output dataset for the retrained model version. In some embodiments, the one or more processors are additionally or alternatively configured to modify, using a multi-armed bandit model, the defined confidence threshold based on the reward indicator for the retrained model version to generate a modified confidence threshold for the machine learning model. In some embodiments, the one or more processors are additionally or alternatively configured to initiate the performance of the machine learning model based on the modified confidence threshold.

In some embodiments, one or more non-transitory computer-readable storage media include instructions that, when executed by one or more processors, cause the one or more processors to generate a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold. In some embodiments, the instructions, when executed by the one or more processors, additionally or alternatively cause the one or more processors to generate a plurality of retrained model versions of the machine learning model based on the plurality of training datasets. In some embodiments, the instructions, when executed by the one or more processors, additionally or alternatively cause the one or more processors to generate a reward indicator for a retrained model version of the plurality of retrained versions of the machine learning model based on a comparison between a validation dataset for the machine learning model and a respective output dataset for the retrained model version. In some embodiments, the instructions, when executed by the one or more processors, additionally or alternatively cause the one or more processors to modify, using a multi-armed bandit model, the defined confidence threshold based on the reward indicator for the retrained model version to generate a modified confidence threshold for the machine learning model. In some embodiments, the instructions, when executed by the one or more processors, additionally or alternatively cause the one or more processors to initiate the performance of the machine learning model based on the modified confidence threshold.

DETAILED DESCRIPTION

Figure 1:
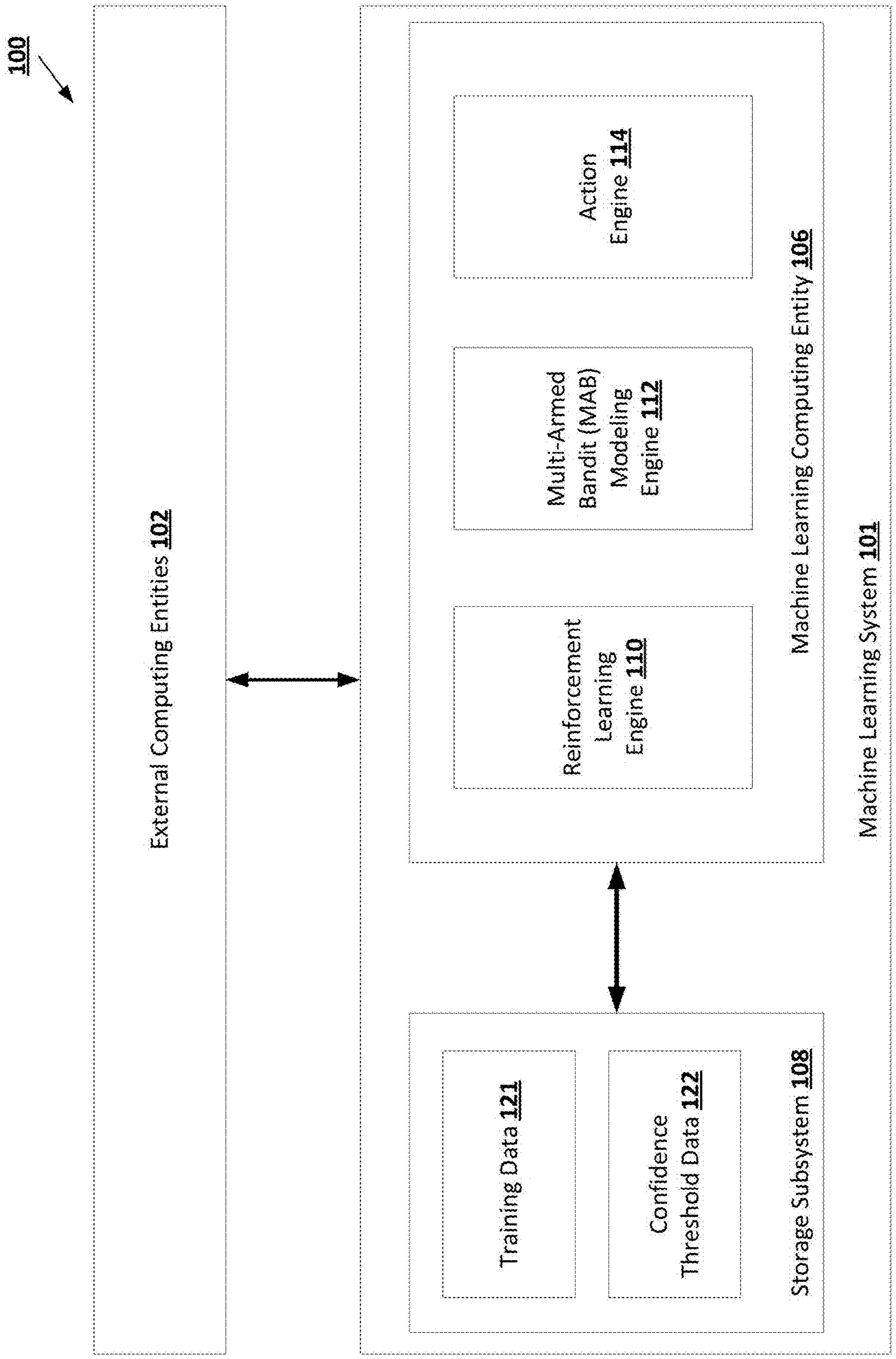
FIG. 1 provides an example overview of an architecture in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that the present disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

I. COMPUTER PROGRAM PRODUCTS, METHODS, AND COMPUTING ENTITIES

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together, such as, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In some embodiments, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In some embodiments, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments may produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE FRAMEWORK

FIG. 1 provides an example overview of an architecture 100 that may be used to practice embodiments of the present disclosure. The architecture 100 includes a machine learning system 101 and one or more external computing entities 102. For example, at least some of the one or more external computing entities 102 may provide inputs to the machine learning system 101. Additionally, or alternatively, at least some of the one or more external computing entities 102 may receive decision outputs, task outputs, machine learning outputs, prediction outputs, classification outputs, and/or action outputs from the machine learning system 101 in response to providing the inputs. As another example, at least some of the external computing entities 102 may provide one or more data streams and/or one or more batch loads to the machine learning system 101 and request performance of particular prediction-based actions in accordance with the provided one or more data streams and/or one or more batch loads. As a further example, at least some of the external computing entities 102 may provide training data (e.g., one or more training datasets) to the machine learning system 101 and request training of one or more machine learning models in accordance with the provided training data. In some of the noted embodiments, the machine learning system 101 may be configured to transmit parameters, hyper-parameters, weights, and/or confidence thresholds of a trained machine learning model to the external computing entities 102.

In some embodiments, the machine learning system 101 may include a machine learning computing entity 106. The machine learning computing entity 106 and the external computing entities 102 may be configured to communicate over a communication network (not shown). The communication network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The machine learning computing entity 106 may be configured to provide one or more predictions using one or more artificial intelligence techniques and/or one or more machine learning techniques. For instance, the machine learning computing entity 106 may be configured to determine forecasts, insights, predictions, and/or classifications related to data from one or more database systems. The machine learning computing entity 106 may be additionally, or alternatively configured to compute optimal decisions, display optimal data for a dashboard (e.g., a graphical user interface), generate optimal data for reports, optimize actions, and/or optimize configurations associated with a decision management system, a workflow management system, a clinical decision automation system, a medical claim adjudication system, a clinical review system, and/or another type of system.

The machine learning computing entity 106 includes a reinforcement learning engine 110, a MAB modeling engine 112, and/or an action engine 114. The reinforcement learning engine 110 performs reinforcement learning for a machine learning model via one or more training stages for the machine learning model. In some embodiments, the reinforcement learning engine 110 utilizes a dynamically configured confidence threshold for augmenting and/or generating a labeled dataset for the machine learning model. In some embodiments, the reinforcement learning engine 110 performs data labeling and/or feature extractions associated with data (e.g., categorical data, text data, imagery data, and/or numerical data) to determine one or more training datasets for the machine learning model. In some embodiments, a training dataset may include binary labels associated with the data. The reinforcement learning engine 110 additionally, or alternatively performs training with respect to one or more machine learning models based on the training dataset. For example, the reinforcement learning engine 110 may perform a training process associated with one or more training stages to provide a trained machine learning model that satisfies quality and/or accuracy criterion for one or more machine learning tasks such as forecasts, insights, predictions, and/or classifications related to data. The MAB modeling engine 112 performs multi-armed bandit modeling to dynamically configure the confidence threshold for the machine learning model.

The action engine 114 performs one or more actions (e.g., one or more machine learning actions) using a retrained version of the machine learning model. In some embodiments, the action engine 114 may additionally, or alternatively utilize one or more predictions and/or classifications associated with a retrained version of the machine learning model to perform one or more actions. In some embodiments, the action engine 114 may utilize one or more predictions and/or classifications to provide one or more visualizations via user interface of a display (e.g., display 316). In certain embodiments, the action engine 114 may utilize one or more predictions and/or classifications to further optimize and/or retrain the machine learning model. As such, the machine learning computing entity 106 may provide accurate, efficient and/or reliable predictions and/or classifications using machine learning. Further example operations of the reinforcement learning engine 110, the MAB modeling engine 112, and/or the action engine 114 are described with reference to at least FIGS. 4-9.

Additionally, in some embodiments, the machine learning system 101 includes a storage subsystem 108. In some embodiments, the storage subsystem 108 stores training data 121 and/or confidence threshold data 122. The training data 121 may include one or more training datasets associated with the machine learning model undergoing reinforcement learning. For example, the training data 121 may include one or more training datasets utilized by the reinforcement learning engine 110. The confidence threshold data 122 may include one or more defined confidence thresholds for one or more machine learning models. The storage subsystem 108 may include one or more storage units, such as multiple distributed storage units that are connected through a computer network. In certain embodiments, the training data 121 and/or the confidence threshold data 122 may be stored in disparate storage units (e.g., disparate databases) of the storage subsystem 108. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Various embodiments provide technical solutions to technical problems corresponding to machine learning training and/or machine learning data analysis. For example, semi-supervised learning is a common technique utilized for machine learning technologies. With semi-supervised learning, a training dataset includes labeled data and unlabeled data to train a machine learning model. Typically, the unlabeled data is larger than the labeled data. However, training the machine learning model with a larger amount of unlabeled data than labeled data may result in inaccurate predictions and/or other performance issues for the machine learning model. Moreover, obtaining the labeled data is typically expensive, laborious, and/or time-consuming. For example, the process of labeling training data typically involves contextual understanding, applying prior domain knowledge, and/or utilization of heuristics to determine ground truth labels. As such, by utilizing the architecture 100 and/or one or more other embodiments disclosed herein, one or more technical improvements may be provided such as improved accuracy and a reduction in computationally intensiveness and time intensiveness needed for training and/or optimizing machine learning models. With the architecture 100 and/or one or more other embodiments disclosed herein, improved accuracy and a reduction in computational resources required for performing machine learning data analysis using one or more machine learning models may also be provided. The architecture 100 and/or one or more other embodiments disclosed herein may also allocate processing resources, memory resources, and/or other computational resources to other tasks while executing one or more processes related to providing machine learning data analysis in parallel. As such, various embodiments of the present disclosure therefore provide improvements to the technical field of machine learning. In certain embodiments, a graphical user interface of a computing device that renders at least a portion of predictions, classifications, and/or insights may also be improved by optimally presenting visual data related to the predictions, classifications, and/or insights.

III. EXAMPLES OF CERTAIN TERMS

In some embodiments, the term "machine learning model" refers to a data construct that describes parameters, hyperparameters, coefficients, and/or defined operations to provide one or more predictions, inferences, labels, and/or classifications related to an input dataset. In various embodiments, the machine learning model utilizes one or more machine learning techniques using parameters, hyperparameters, and/or defined operations. A machine learning model may include one or more of any type of machine learning model including one or more supervised, unsupervised, semi-supervised, reinforcement learning models, and/or the like. For instance, a machine learning model may include a semi-supervised model that may be trained using a training dataset. In some examples, a machine learning model may include multiple models configured to perform one or more different stages of a prediction, inference, and/or classification process.

In some embodiments, the machine learning model is a neural network, a deep learning model, a convolutional neural network model, a classification model, a logistic regression model, a decision tree, a random forest, support vector machine (SVM), a Naïve Bayes classifier, and/or any other type of machine learning model. For instance, the machine learning model may include one or more rule-based layers that depend on trained parameters, hyperparameters, coefficients, defined operations, and/or the like. In some examples, the machine learning model is trained (e.g., by updating the one or more parameters, and/or the like) using one or more semi-supervised training techniques. In some embodiments, the machine learning model utilizes reinforcement learning to provide a trained version of the machine learning model. Additionally, in some embodiments, the machine learning model utilizes a defined confidence threshold to provide the one or more predictions, inferences, labels, and/or classifications related to an input dataset. In some examples, a configuration, type, and/or other characteristics of the machine learning model may be dependent on the particular domain. In various embodiments, the machine learning model is trained, using a training dataset, to generate a classification (and/or probability thereof) for a particular domain.

In some embodiments, the term "training dataset" refers to input data provided to the machine learning model during one or more training stages for the machine learning model to train and/or configure the machine learning model to perform a prediction, inference, labeling, and/or classification task based on the particular domain for the machine learning model. The type, format, and/or parameters of the training dataset may be based on the particular domain for the machine learning model. In various embodiments, the training dataset includes labeled data and unlabeled data.

In some embodiments, the term "labeled dataset" refers to a collection of data constructs that respectively provide a label or other classification. In some embodiments, a labeled dataset includes ground-truth labels, such as binary labels, ground-truth classifications, ground-truth text classifications, ground-truth numerical classifications, ground-truth categorical classifications, and/or the like). In some embodiments, respective labels of the labeled dataset may include one or more features or attributes for the respective label.

In some embodiments, the term "unlabeled dataset" refers to a collection of data constructs without a label or other classification. In some embodiments, respective unlabeled data of the unlabeled dataset may include one or more features or attributes.

In some embodiments, the term "synthetic labeled dataset" refers to a collection of artificial data constructs that respectively provide a label or other classification. In some embodiments, respective synthetic labels of the synthetic labeled dataset may be based on inferences, characteristics, patterns, and/or distributions related to the labeled dataset. In some embodiments, the respective synthetic labels of the synthetic labeled dataset may be generated based on a reinforcement learning process associated with a machine learning model. In some embodiments, the synthetic labeled dataset may be generated based on a data labeling process for the unlabeled dataset. In some embodiments, respective synthetic labels of the synthetic labeled dataset may be generated based on a determination that the respective synthetic label and/or related data inference satisfies a defined confidence threshold for machine learning model.

In some embodiments, the term "defined confidence threshold" refers to a data construct corresponding to a threshold value for assigning new labels to data via a machine learning model. The defined confidence threshold may allow the machine learning model to be iteratively retrained via labels and pseudo labels. In some embodiments, the defined confidence threshold may be utilized during a reinforcement learning process to determine whether a synthetic label is to be included in a training dataset for the machine learning model. For example, the defined confidence threshold may be optimally configured as a cutoff indicator for quality and/or accuracy of a pseudo label as provided by the machine learning model.

In some embodiments, the term "reward indicator" refers to a data construct corresponding to a performance goal for a machine learning model. In some embodiments, the reward indicator may be related to quality, accuracy, defined metrics, defined rules, defined standards, defined behavior, and/or other performance criterion utilized to establish a performance goal for output provided by a machine learning model.

In some embodiments, the term "retrained model version" refers to a machine learning model that has undergone two or more training stages. For example, a retrained model version may refer to a retrained version of a machine learning model. In some embodiments, a retrained model version of a machine learning model may be a result of reinforcement learning with respect to a machine learning model.

In some embodiments, the term "multi-armed bandit model" refers to a data construct that describes a machine learning framework including parameters, hyperparameters, coefficients, and/or defined operations utilized to determine an optimal confidence threshold for a machine learning model. In some embodiments, the multi-armed bandit model utilizes reinforcement learning with respect to an upper confidence bound prediction for confidence thresholds.

In some embodiments, the term "upper confidence bound (UCB) prediction" refers to a data construct that describes a reinforcement learning prediction related to an optimal confidence threshold for a machine learning model.

In some embodiments, the term "predefined performance metric" refers to a data construct corresponding to predicted or measured accuracy for a training dataset and/or binary labels. In various embodiments, the predefined performance metric represents a performance evaluation result for a training dataset and/or binary labels. In various embodiments, the predefined performance metric is an accuracy score such as an F-score (e.g., an F1 score). For example, the predefined performance metric may be determined using micro-averaging or macro-averaging of classification frequency in a training dataset and/or a set of binary labels In some embodiments, the term "plurality of candidate confidence parameters" refers to data construct corresponding to one or more confidence parameters that define an action space for a multi-armed bandit model. For example, the respective confidence parameters of the plurality of candidate confidence parameters may correspond to candidate actions for the multi-armed bandit model.

In some embodiments, the term "hyperparameter configuration" refers to a particular configuration for parameters, hyperparameters, coefficients, and/or defined operations of a machine learning model.

In some embodiments, the term "binary label" refers to a data construct that classifies data as either a first binary label (e.g., a first class label) or a second binary label (e.g., a second class label) for a particular domain. For example, a binary label may classify data as either "high" risk or "low" risk. In another example, a binary label may classify data as either "yes" or "no".

In some embodiments, the term "prediction output" refers to a data construct that describes one or more prediction insights, classifications, and/or inferences provided by one or more machine learning models. In various embodiments, prediction insights, classifications, and/or inferences may be with respect to one or more data objects and/or features of one or more groupings of text, such as, one or more portions of a document. In certain embodiments, a prediction output may provide a prediction as to whether medical records for a patient indicates that a patient is associated with a particular type of disease, such as, a particular type of rare disease.

In some embodiments, the term "machine learning framework" refers to a data construct that describes parameters, hyperparameters, and/or defined operations of one or more machine learning models configured to generate a prediction output for a prediction input data object. In some embodiments, the machine learning framework process one or more input segments, one or more document segments, one or more predictive codes, categorical data, and/or other data related to one or more input document data objects. A machine learning framework may be configured to provide a prediction for one or more input segments, one or more document segments, one or more predictive codes, categorical data, and/or other data related to one or more input document data objects via respective attributes and/or features for one or more data representations applied to the one or more machine learning techniques.

IV. OVERVIEW

Some embodiments of the present disclosure address technical challenges related to machine learning data analysis in a computationally efficient and predictively reliable manner. Existing machine learning data analysis systems are generally ill-suited to accurately, efficiently, and/or reliably perform predictive data analysis in various domains, such as domains that are associated with high-dimensional categorical feature spaces with a high degree of cardinality. Additionally, creating ground truth labels for training data for machine learning data analysis is expensive, laborious, and/or time-consuming. For example, the process of labeling training data typically involves contextual understanding, applying prior domain knowledge, and/or utilization of heuristics to determine inconsistent and incomplete ground truth labels for portions of a training dataset. Moreover, existing frameworks for labeling training data do not objectively perform quality assessment of labels and/or other training data for classification tasks. Additionally, configuring machine learning techniques using sparse data and/or data stored in disparate data sources is difficult, resource intensive, and/or inefficient. For example, training of a machine learning models based on sparse data may result in reduced accuracy and inaccurate predictions.

Some embodiments of the present disclosure provide methods, apparatus, systems, computing devices, computing entities, and/or the like for analysis of digital data using machine learning. In various embodiments, methods, apparatus, systems, computing devices, computing entities, and/or the like provide quality assurance for synthetically labeled data utilized to train one or more machine learning models.

Certain embodiments utilize methods, apparatus, systems, computing devices, computing entities, and/or the like for additionally performing actions based on the analysis of the digital data and/or predictions associated therewith. In various embodiments, machine learning models may provide classification predictions, such as, diagnostic predictions or other predictions related to categorical data. As will be recognized, some of the embodiments of the present disclosure may be used to perform any type of artificial intelligence for predictions related to categorical data. Examples of artificial intelligence include, but are not limited to, machine learning, supervised machine learning (e.g., classification analysis, regression analysis, etc.), semi-supervised machine learning, classifiers, logistic regression modeling, linear regression modeling, unsupervised machine learning (e.g., clustering analysis, etc.), deep learning, neural network architectures, and/or the like.

In some prediction domains, machine learning models may be trained on sparse or external data due to a lack of accessibility to robust training datasets. By way of example, in clinical prediction domains, healthcare organizations may rely on information from disparate database systems to facilitate providing one or more products and/or one or more services. By relying on such data, models developed for these prediction domains require additional processing and memory resources. Even if available, the data accessed for training the models may be inefficient in breadth to accurately, efficiently, and/or reliably provide insights and forecasts related a particular prediction domain.

In prediction domains that are limited to sparse or external datasets, such as the clinical prediction domain in the above example, validating the consistency of target labels in a dataset has an increased significance to the viability of a predictive analysis process as errors in labels obtained via human annotation may adversely impact performance of a trained model on unseen data. This may be especially influential for certain types of predictive analysis tasks, such as predicting rare events (e.g., rare diseases using clinical data, etc.), predicting the risk (e.g., low risk vs. high risk) of a rare event, and/or the like. In some examples, the target variable in such use cases may be a binary label and the successful outcome of the predictive analysis may depend on how well these binary labels have been annotated.

Traditionally, generation of pseudo labels for a machine learning model may result in errors when labeling such data. The prevalence of such error may be intensified in prediction domains in which a binary classification is contingent on multiple factors without a clear-cut demarcation of a particular classification over another classification. By way of example, in a clinical domain for classifying a patient's risk of disease, an annotation consistency issue may arise when a first and second patient with similar conditions should have similar risk factors, but the predicted risk for the first and second patients are inconsistent (e.g., the first patient is correlated to a high-risk label via a machine learning model and the second patient is correlated to a low-risk label via the machine learning model). Inconsistent labels, such as these, are difficult to detect in data for accurate quality assurance of data labeling and result in significant performance degradation for machine learning models.

Various embodiments of the present disclosure address technical challenges related to providing insights and/or forecasts related to data for accurately, efficiently, and reliably performing predictive data analysis in prediction domains. In various embodiments, quality assurance for machine learning is provided using various techniques related to training datasets. In various embodiments, quality assurance for machine learning is provided using dynamic confidence thresholds related to data labels such as, for example, synthetic data labels. For example, reinforcement learning for machine learning model is provided using dynamic confidence thresholds. In various embodiments, a quality assurance technique may be provided to assist with managing and/or identifying inconsistencies across synthetic data labels in order to improve learning capabilities for machine learning processes and/or machine learning models. By minimizing inconsistencies across synthetic data labels, a more reliable and more accurate training dataset of a machine learning may be provided.

In various embodiments, improved data labeling for a machine learning model is provided using reinforcement learning techniques for semi-supervised learning. For example, reinforcement learning techniques may be performed to reliably train machine learning models. In various embodiments, pseudo labels for an unlabeled data corpus associated with a machine learning model may be provided via reinforcement learning. The improved data labeling as disclosed herein may provide improvements for semi-supervised data labeling such as, for example, providing automatic hyperparameter selection, model stochasticity, and/or an optimality guarantee for a machine learning model. In various embodiments, one or more deterministic techniques may be utilized to determine optimized hyperparameter configurations for the machine learning model. Additionally, an optimally selected confidence threshold for assigning new labels may be determined to expand the labeled dataset by assigning pseudo-labels that satisfy quality criterion to unlabeled data records. In this way, the machine learning model may be iteratively retrained on both given labels and pseudo-labels to provide an optimized version of the machine learning model. Moreover, with the optimized version of the machine learning model, model stochasticity for the machine learning model may be achieved.

In various embodiments, the improved data labeling for training data includes partitioning a labeled data set into a training data set and a validation data, training a model based on the training data set and the validation data, inferring predictions on an unlabeled dataset using the trained model and adding confident predictions above a defined confidence threshold as synthetic labels to the training data, retraining the model on the updated training data and calculating a reward as a binary indicator of performance improvement from previous training iterations, and/or utilizing a MAB approach with a UCB algorithm to determine an optimal confidence threshold that maximizes an expected reward.

In various embodiments, the trained machine learning model may be utilized for one or more machine learning tasks in response to a determination that the optimal confidence threshold satisfies quality criterion. For example, the trained machine learning model may be utilized to provide classification predictions such as diagnostic predictions. In certain embodiments, the trained machine learning model may be utilized to identify diseases and/or risk profiles associated therewith. In certain embodiments, a front-end visualization may also be provided for end-users to engage with a prediction task or another type of insight related to forecasted outputs, insights, predictions, and/or classifications.

The data labeling techniques of the present disclosure may provide a machine learning model that is more efficient to train and/or more reliable after a trained version of the machine learning model is generated. In doing so, various embodiments of the present disclosure address shortcomings of existing machine learning data analysis solutions and enable solutions that are capable of efficiently and reliably performing machine learning data analysis in prediction domains with sparse input spaces as well as conveying temporal information.

The data labeling techniques of the present disclosure may also provide significant advantages over existing technological solutions such as improved integrability, reduced complexity, improved accuracy, and/or improved speed as compared to existing technological solutions for providing insights and/or forecasts related to data. Accordingly, by employing various techniques related to the quality assurance for machine learning disclosed herein, various embodiments of the present disclosure enable utilizing efficient and reliable machine learning solutions to process data feature spaces with a high degree of size, diversity, and/or cardinality. In doing so, various embodiments of the present disclosure address shortcomings of existing system solutions and enable solutions that are capable of accurately, efficiently, and/or reliably providing forecasts, insights, and classifications to facilitate optimal decisions and/or actions for particular prediction domains, such as those related to the health information with sparse datasets.

Moreover, by employing various techniques related to data labeling for a machine learning model disclosed herein, one or more other technical benefits may be provided, including improved interoperability, improved reasoning, reduced errors, improved information/data mining, improved analytics, and/or the like related to machine learning. Accordingly, the data labeling techniques of the present disclosure provide improved predictive accuracy, while improving training speeds given a constant predictive accuracy. In doing so, the techniques described herein may additionally, or improve efficiency and speed of training machine learning models, thus reducing the number of computational operations needed and/or the amount of training data entries needed to effectively train machine learning models. Accordingly, the techniques described herein improve the computational efficiency, storage-wise efficiency, and speed of training machine learning models.

Examples of technologically advantageous embodiments of the present disclosure include: (i) automated data labeling techniques via reinforcement learning for training and/or optimizing a machine learning model, (ii) automated confidence threshold selection techniques for optimizing selection of pseudo labels for machine learning training, (iii) automated optimization of hyper-parameters of a machine learning model, among others. Other technical improvements and advantages may be realized by one of ordinary skill in the art.

V. EXAMPLE SYSTEM OPERATIONS

As described herein, some embodiments of the present disclosure provide improved data labeling techniques for a machine learning model to enable efficient and reliable machine learning solutions to process data feature spaces with a high degree of size, diversity, and/or cardinality. In doing so, various embodiments of the present disclosure enable machine learning solutions that are capable of accurately, efficiently, and reliably providing forecasts, insights, and classifications to facilitate optimal decisions and/or actions in prediction domains with complex datasets, such as clinical domains with complex datasets. Moreover, by employing various techniques related to the machine learning framework disclosed herein, one or more other technical benefits may be provided, including improved interoperability, improved reasoning, reduced errors, improved information/data mining, improved analytics, and/or the like related to machine learning. Accordingly, the improved quality assurance techniques of the present disclosure and the machine learning frameworks thereof may provide improved predictive accuracy without reducing training speed and also enable improving training speed given a constant predictive accuracy. In doing so, the techniques described herein may additionally, or alternatively improve efficiency and speed of training machine learning models, thus reducing the number of computational operations needed and/or the amount of training data entries needed to train machine learning models. Accordingly, the techniques described herein improve the computational efficiency, storage-wise efficiency, and speed of training machine learning models.

Example Machine Learning Computing Entity

Figure 2:
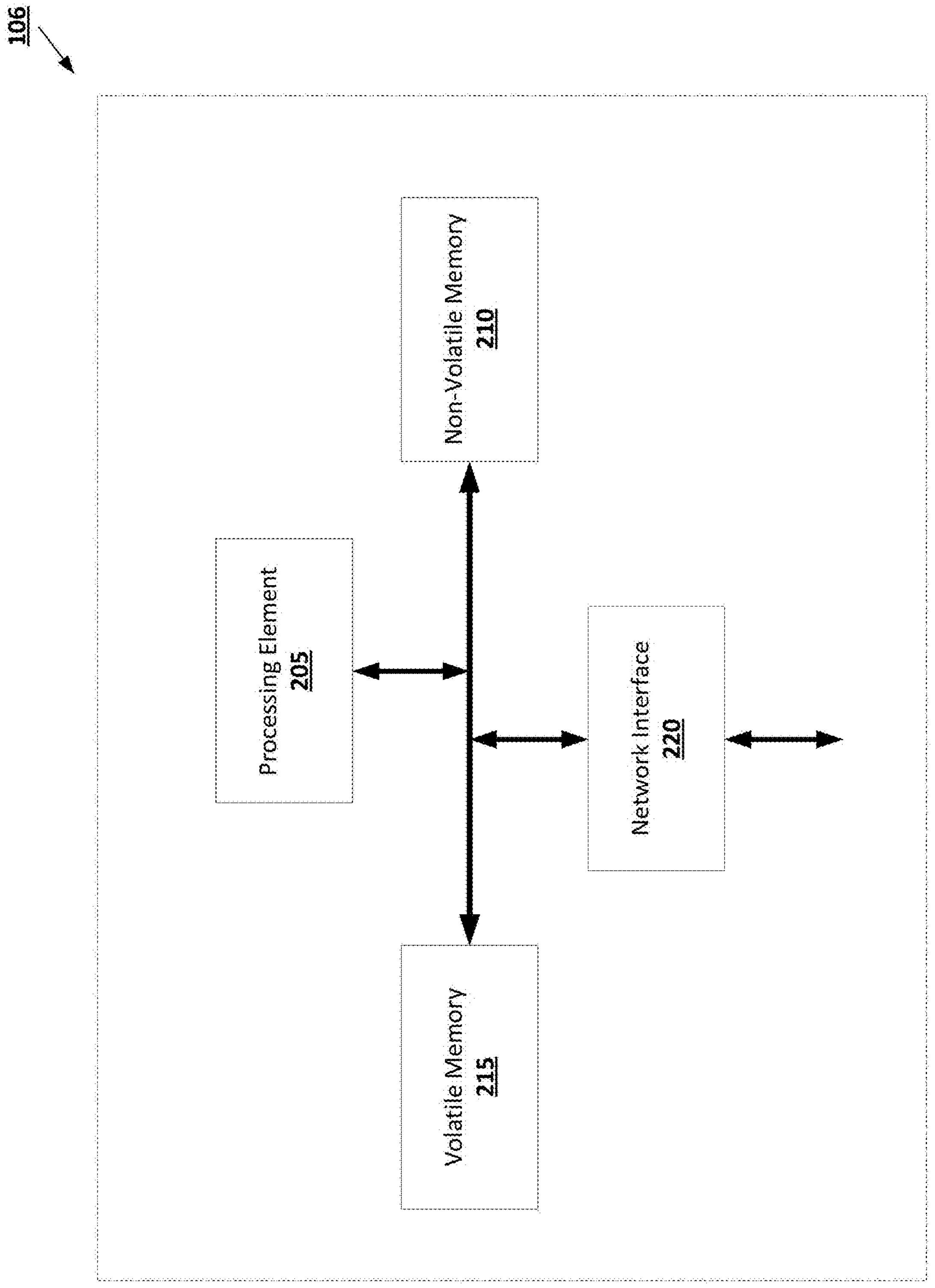
FIG. 2 provides an example machine learning computing entity in accordance with one or more embodiments of the present disclosure.

FIG. 2 provides a schematic of the machine learning computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes may be performed on data, content, information, and/or similar terms used herein interchangeably.

As indicated, in one embodiment, the machine learning computing entity 106 may also include a network interface 220 for communicating with various computing entities, such as by communicating data, content, information, and/or similar terms used herein interchangeably that may be transmitted, received, operated on, processed, displayed, stored, and/or the like. Furthermore, it is to be appreciated that the network interface 220 may include one or more network interfaces.

As shown in FIG. 2, in one embodiment, the machine learning computing entity 106 may include or be in communication with processing element 205 (also referred to as processors, processing circuitry, and/or similar terms used herein interchangeably) that communicate with other elements within the machine learning computing entity 106 via a bus, for example. It is to be appreciated that the processing element 205 may include one or more processing elements. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the machine learning computing entity 106 may further include or be in communication with non-volatile memory 210. The non-volatile memory 210 may be non-volatile media (also referred to as non-volatile storage, memory, memory storage, memory circuitry, and/or similar terms used herein interchangeably). Furthermore, in an embodiment, non-volatile memory 210 may include one or more non-volatile storage or memory media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the machine learning computing entity 106 may further include or be in communication with volatile memory 215. The volatile memory 215 may be volatile media (also referred to as volatile storage, memory, memory storage, memory circuitry, and/or similar terms used herein interchangeably). Furthermore, in an embodiment, the volatile memory 215 may include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the machine learning computing entity 106 with the assistance of the processing element 205 and operating system.

As indicated, in one embodiment, the machine learning computing entity 106 may also include the network interface 220. In an embodiment, the network interface 220 may be one or more communications interfaces for communicating with various computing entities, such as by communicating data, content, information, and/or similar terms used herein interchangeably that may be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the machine learning computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the machine learning computing entity 106 may include or be in communication with one or more input elements, such as a keyboard input, a mouse input, a touch screen/display input, motion input, movement input, audio input, pointing device input, joystick input, keypad input, and/or the like. The machine learning computing entity 106 may also include, or be in communication with, one or more output elements (not shown), such as audio output, video output, screen/display output, motion output, movement output, and/or the like.

Example External Computing Entity

Figure 3:
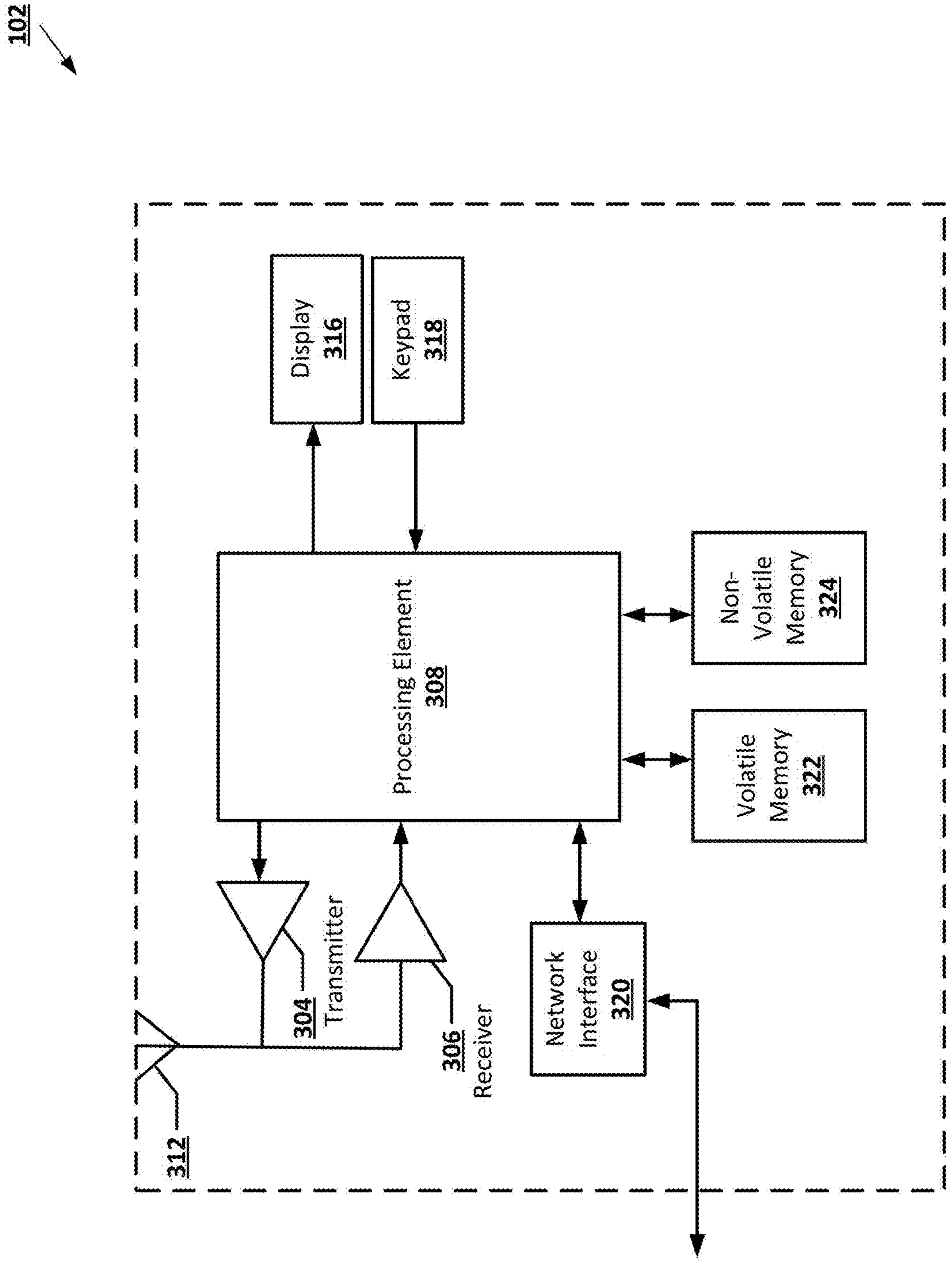
FIG. 3 provides an example external computing entity in accordance with one or more embodiments of the present disclosure.

FIG. 3 provides an illustrative schematic representative of an external computing entity 102 that may be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The external computing entity 102 may be operated by various parties. As shown in FIG. 3, the external computing entity 102 may include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) which provide signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the machine learning computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the machine learning computing entity 106 via a network interface 320.

Via these communication standards and protocols, the external computing entity 102 may communicate with various other entities using concepts, such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 may also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module may acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data may be collected using a variety of coordinate systems, such as the DecimalDegrees (DD); Degrees, Minutes, Seconds (DMS); Universal Transverse Mercator (UTM); Universal Polar Stereographic (UPS) coordinate systems; and/or the like. Alternatively, the location information/data may be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects may be used in a variety of settings to determine the location of someone or something to within inches or centimeters.

The external computing entity 102 may also comprise a user interface (that may include a display 316 coupled to the processing element 308) and/or a user input interface (coupled to the processing element 308). For example, the user interface may be a user application, browser, user interface, graphical user interface, dashboard, and/or similar words used herein interchangeably executing on and/or accessible via the external computing entity 102 to interact with and/or cause display of information/data from the machine learning computing entity 106, as described herein. The user input interface may comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 may include (or cause display of) the conventional numeric (0-9) and related keys (#, *) and other keys used for operating the external computing entity 102, and may include a full set of alphabetic keys or set of keys that may be activated to provide a full set of alphanumeric keys. In addition to providing input, the user input interface may be used, for example, to activate or deactivate certain functions, such as screen savers and/or sleep modes.

The external computing entity 102 may also include volatile memory 322 and/or non-volatile memory 324, which may be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile memory 322 and/or the non-volatile memory 324 may store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the machine learning computing entity 106 and/or various other computing entities.

In another embodiment, the external computing entity 102 may include one or more components or functionalities that are the same or similar to those of the machine learning computing entity 106, as described in greater detail above. As will be recognized, these architectures and descriptions are provided for example purposes only and are not limited to the various embodiments.

In various embodiments, the external computing entity 102 may be embodied as an artificial intelligence (AI) computing entity, such as a virtual assistant AI device, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

As described below, various embodiments of the present disclosure introduce techniques that improve the training accuracy and/or speed of processing machine learning frameworks by introducing a machine learning framework architecture that provides improved data labeling for machine learning using dynamic confidence thresholds related to reinforcement learning. The combination of the noted components enables the proposed machine learning framework to generate more accurate predictions, which in turn increases the training speed of the proposed machine learning framework given a desired predictive accuracy. It is well-understood in the relevant art that there is typically a tradeoff between predictive accuracy and training speed, such that it is trivial to improve training speed by reducing predictive accuracy, and thus the real challenge is to improve training speed without sacrificing predictive accuracy through innovative model architectures. Accordingly, techniques that improve predictive accuracy without harming training speed, such as various techniques described herein, enable improving training speed given a constant predictive accuracy. Therefore, by improving accuracy of performing machine learning predictions using dynamic confidence thresholds related to reinforcement learning, various embodiments of the present disclosure improve the training speed of machine learning frameworks given a target predictive accuracy.

In general, embodiments of the present disclosure provide methods, apparatus, systems, computing devices, computing entities, and/or the like for providing data labeling for machine learning using dynamic confidence thresholds related to reinforcement learning. Certain embodiments of the systems, methods, and computer program products that facilitate recommendation prediction and/or prediction-based actions employ one or more trained machine learning models and/or one or more machine learning techniques.

Various embodiments of the present disclosure address technical challenges related to accurately, efficiently, and/or reliably performing machine learning data analysis of complex data stored in data sources. For example, in various embodiments, proposed solutions provide for training machine learning models with respect to training datasets that include text data, numerical data, imagery data, and/or categorical data. In various embodiments, proposed solutions disclose classification predictions using machine learning. In some embodiments, one or more machine learning models to facilitate classification predictions may be trained and/or generated based on the training data 121 and/or the confidence threshold data 122. After the one or more machine learning models are generated, the one or more machine learning models may be utilized to perform accurate, efficient, and reliable classification predictions.

Reinforcement Learning for Machine Learning using Dynamic Confidence Thresholds

Figure 4:
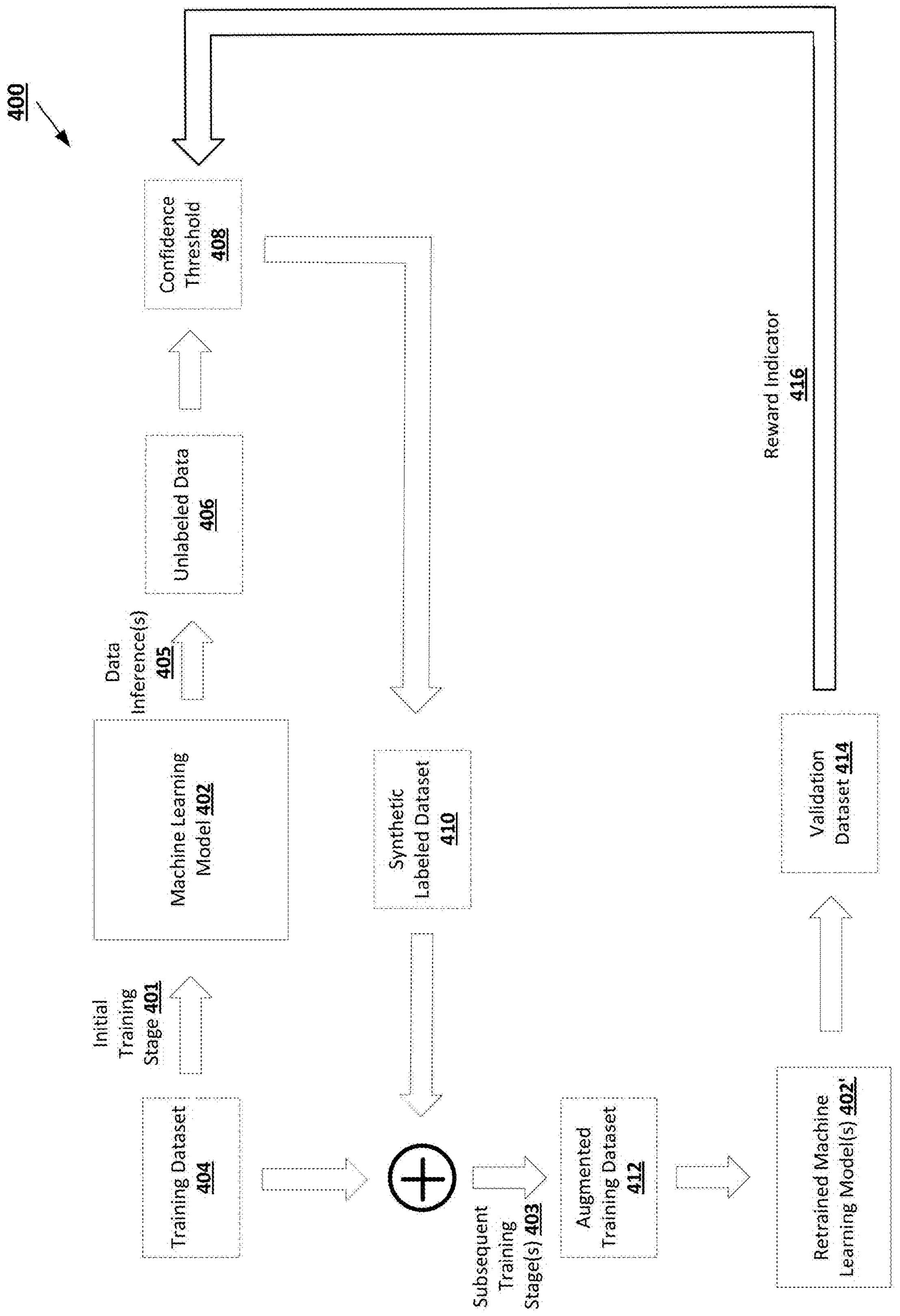
FIG. 4 provides an example computing system that provides reinforcement learning for machine learning using dynamic confidence thresholds in accordance with one or more embodiments of the present disclosure.

FIG. 4 provides an example computing system 400 related to one or more machine learning models associated with the machine learning computing entity 106 (e.g., the reinforcement learning engine 110, the MAB modeling engine 112, and/or the action engine 114), in accordance with one or more embodiments of the present disclosure. The computing system 400 includes a machine learning model 402. The machine learning model 402 may be a configured to execute one or more machine learning techniques related to prediction tasks, inference tasks, labeling tasks, and/or classifications tasks. Additionally, the machine learning model 402 may be a neural network, a deep learning model, a convolutional neural network model, a classification model, a logistic regression model, a decision tree, a random forest, an SVM, a Naïve Bayes classifier, and/or any other type of machine learning model. In a non-limiting example, the machine learning model 402 is a classification model or another type of model configured to execute one or more machine learning techniques related to classification tasks. The machine learning model 402 may be trained using a training dataset 404. The training dataset 404 may include at least a set of labels associated with text data, numerical data, categorical data, imagery data, and/or other data. In certain embodiments, the set of labels may be a set of binary labels. In certain embodiments, at least a portion of the set of labels may be associated with data related to disparate data sources. In various embodiments, at least a portion of the training data 121 may correspond to the training dataset 404.

In various embodiments, the machine learning computing entity 106 (e.g., the reinforcement learning engine 110) performs one or more training stages based on the training dataset 404 to train the machine learning model 402. For example, the machine learning computing entity 106 (e.g., the reinforcement learning engine 110) may perform an initial training stage 401 to provide an initial trained version of the machine learning model 402. Additionally, the machine learning computing entity 106 (e.g., the reinforcement learning engine 110) may perform one or more subsequent training stages 403 to provide one or more retrained machine learning models 402'. The one or more retrained machine learning models 402' may correspond to one or more retrained trained versions of the machine learning model 402.

In various embodiments, the machine learning computing entity 106 (e.g., the reinforcement learning engine 110) utilizes the machine learning model 402 (e.g., an initial trained version of the machine learning model 402) to provide one or more data inferences 405 with respect to unlabeled data 406. The unlabeled data 406 may be data (e.g., text data, numerical data, categorical data, imagery data, and/or other data) without a label or other classification. The one or more data inferences 405 may include one or more insights, predictions, labels, and/or classifications related to the unlabeled data 406. The machine learning model 402 may utilize a confidence threshold 408 with respect to the one or more data inferences 405 to generate a synthetic labeled dataset 410. For example, the confidence threshold 408 may be utilized to determine a degree of confidence for accuracy of the one or more data inferences 405. As such, if a predicted confidence for a data label for the unlabeled data 406 satisfies the confidence threshold 408, the data label may be added as a data object in the synthetic labeled dataset 410. The synthetic labeled dataset 410 may therefore include synthetic data labels that satisfy a certain degree of confidence for the machine learning model 402. In a non-limiting example, the synthetic labeled dataset 410 may include one or more pseudo labels (e.g., one or more pseudo binary labels) associated with the unlabeled data 406.

In various embodiments, the machine learning computing entity 106 (e.g., the reinforcement learning engine 110) utilizes the synthetic labeled dataset 410 in combination with the training dataset 404 during the one or more subsequent training stages 403 for the machine learning model 402. For instance, the synthetic labeled dataset 410 may be combined with the training dataset 404 to generate an augmented training dataset 412. The augmented training dataset 412 may be utilized during the one or more subsequent training stages 403 to provide the one or more retrained machine learning models 402'.

In various embodiments, the machine learning computing entity 106 (e.g., the reinforcement learning engine 110) utilizes a validation dataset 414 to evaluate quality and/or accuracy of the one or more retrained machine learning models 402'. For example, the validation dataset 414 may be utilized to tune parameters, hyperparameters, coefficients, and/or defined operations of the one or more retrained machine learning models 402'. In certain embodiments, the training dataset 404 additionally includes the validation dataset 414. The validation dataset 414 may include a set of labels associated with text data, numerical data, categorical data, imagery data, and/or other data. In certain embodiments, the set of labels of the validation dataset 414 may be a set of binary labels. Additionally, the set of labels of the validation dataset 414 may be different than the set of labels utilized during the initial training stage 401 for training the machine learning model 402.

In various embodiments, the machine learning computing entity 106 (e.g., the reinforcement learning engine 110) generates a reward indicator 416 for the one or more retrained machine learning models 402'. The machine learning computing entity 106 (e.g., the reinforcement learning engine 110) may generate the reward indicator 416 based on a comparison between the validation dataset 414 and an output dataset for the one or more retrained machine learning models 402'. The output dataset may include one or more data inferences (e.g., one or more insights, predictions, labels, and/or classifications) related to the augmented training dataset 412. The reward indicator 416 may indicate a performance goal for the one or more retrained machine learning models 402'. For example, the reward indicator 416 may be related to quality, accuracy, defined metrics, defined rules, defined standards, defined behavior, and/or other performance criterion utilized to establish a performance goal for the output dataset provided by the one or more retrained machine learning models 402'.

In various embodiments, the machine learning computing entity 106 (e.g., the reinforcement learning engine 110) modifies the confidence threshold 408 based on the reward indicator 416 to generate a modified confidence threshold for the machine learning model 402. The modified confidence threshold may be an optimized confidence threshold for the machine learning model 402 to improve data labeling via the machine learning model 402. In various embodiments, the modified confidence threshold may be utilized to initiate the performance of the machine learning model 402.

In various embodiments, based on the modified confidence threshold, the machine learning computing entity 106 (e.g., the action engine 114) initiates one or more prediction-based actions. In certain embodiments, one or more machine learning actions are initiated using the machine learning model 402 based on the modified confidence threshold. For example, the machine learning model 402 may be utilized for one or more prediction tasks based on the modified confidence threshold. In certain embodiments, the machine learning model 402 may be utilized to generate prediction output based on the modified confidence threshold. The prediction output may be, for example, a classification, diagnostic prediction, insight, and/or inference related to a patient (e.g., related to certain types of disease such as a particular type of rare disease). Additionally, or alternatively, in certain embodiments, one or more graphical elements for an electronic interface are generated based on the modified confidence threshold. The one or more graphical elements may be included in one or more electronic communications to provide one or more notification via the electronic interface. Additionally, or alternatively, one or more graphical elements may facilitate semi-supervised learning and/or binary labeling with respect to a user.

Figure 5:
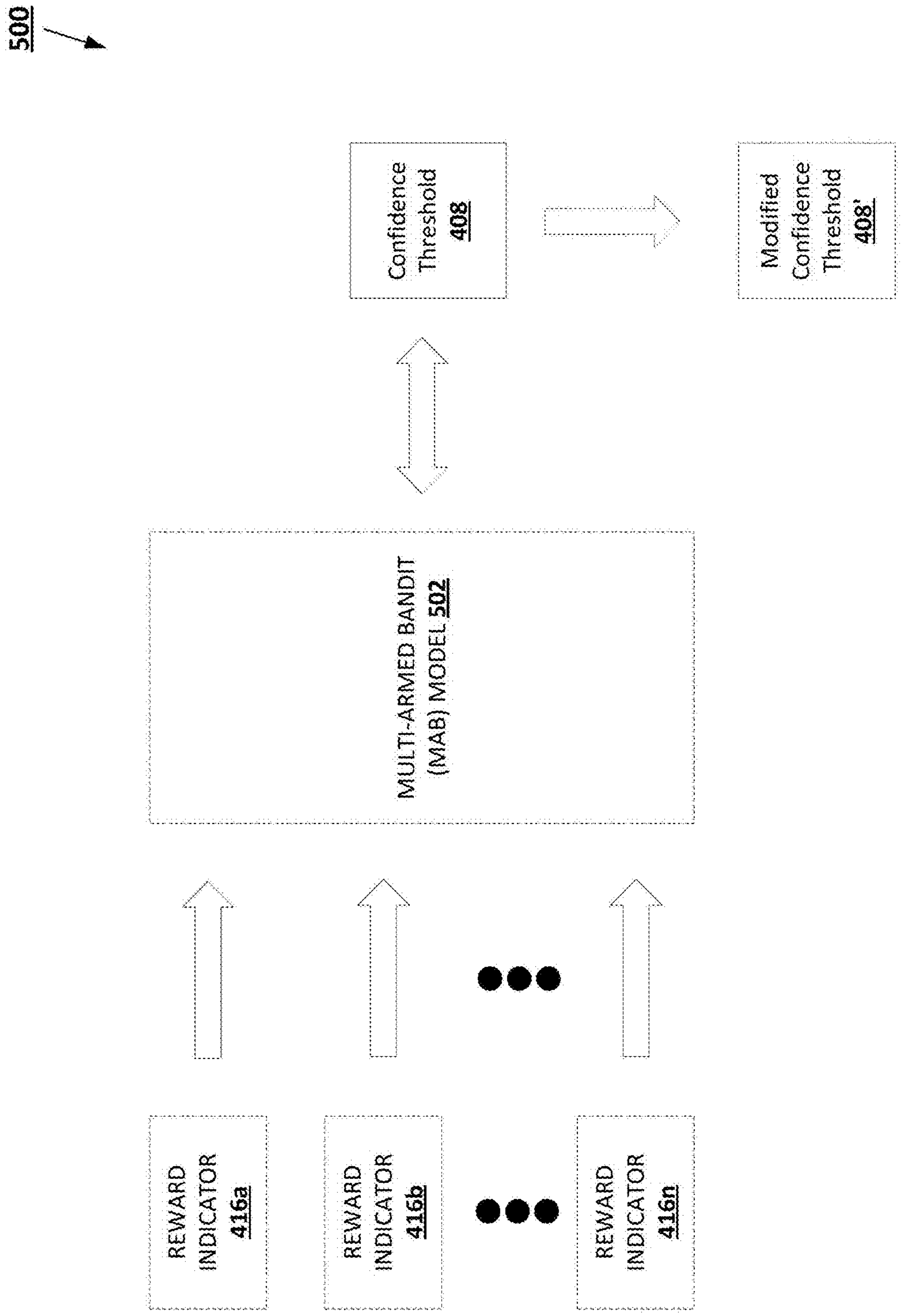
FIG. 5 provides an example computing system that provides multi-armed bandit (MAB) modeling in accordance with one or more embodiments of the present disclosure.

FIG. 5 provides an example computing system 500 related to MAB modeling associated with the machine learning computing entity 106 (e.g., the reinforcement learning engine 110, the MAB modeling engine 112, and/or the action engine 114), in accordance with one or more embodiments of the present disclosure. The computing system 500 includes a MAB model 502. In various embodiments, the machine learning computing entity 106 (e.g., the reinforcement learning engine 110) generates a respective reward indicator 416 for the one or more retrained machine learning models 402'. For example, the machine learning computing entity 106 (e.g., the reinforcement learning engine 110) may generate a first reward indicator **416*a* for a first retrained machine learning model of the retrained machine learning models 402', a second reward indicator 416*b* for a second retrained machine learning model of the retrained machine learning models 402', an nth reward indicator 416*a* for an nth retrained machine learning model of the retrained machine learning models 402'**, etc.

In various embodiments, the machine learning computing entity 106 (e.g., the MAB modeling engine 112) applies the MAB model 502 to the reward indicator 416*a-n* for the retrained machine learning models 402' to modify the confidence threshold 408 and generate a modified confidence threshold 408'. For example, the modified confidence threshold 408' may be an optimized version of the confidence threshold 408 for the machine learning model 402. In various embodiments, the MAB model 502 may utilize reinforcement learning with respect to an upper confidence bound prediction for a confidence threshold set. The confidence threshold set may include a set of candidate confidence parameters for the machine learning model 402. For instance, the confidence threshold set may define an action space with a set of actions for the MAB model 502. In a non-limiting example, an action space may include candidate confidence parameters corresponding to {0.10, 0.25, 0.50, 0.75, 0.95} such that the MAB model 502 may select from five total actions for the confidence threshold 408 machine learning model 402 in order to provide the modified confidence threshold 408'. In various embodiments, for each confidence parameter, the MAB model 502 may determine a probability as to whether a particular modified confidence threshold will increase model performance of the machine learning model 402 based on whether the respective synthetic labeled dataset 410 having a particular model confidence is more than a particular candidate confidence parameter. In various embodiments, the MAB model 502 may utilize an upper confidence bound prediction $\mathcal{A}_t$ as defined in the following equation 1:

$$\mathcal{A}_t = \arg\max_a \left[ \mathcal{R}_{t-1}(a) + \sqrt{\frac{2 \log t}{\mathcal{N}_{t-1}(a)}} \right] \quad \text{(equation 1)}$$

where a corresponds to an action, t corresponds to a number of iterations, $\mathcal{R}_{t-1}(a)$ corresponds to an average reward achieved with action a until t−1 time, and $\mathcal{N}_{t-1}(a)$ corresponds to a number of times action a is selected by the MAB model 502.

In various embodiments, the MAB model 502 may select the confidence value with a highest UCB value as the modified confidence threshold 408' to provide an optimal confidence threshold for the machine learning model 402. In certain embodiments, the machine learning computing entity 106 (e.g., the MAB modeling engine 112) may add the respective synthetic labeled dataset 410 related to the modified confidence threshold 408' to the training dataset 404 for the machine learning model 402. As such, an updated training corpus with improved data labeling for the machine learning model 402 may be provided.

Figure 6:
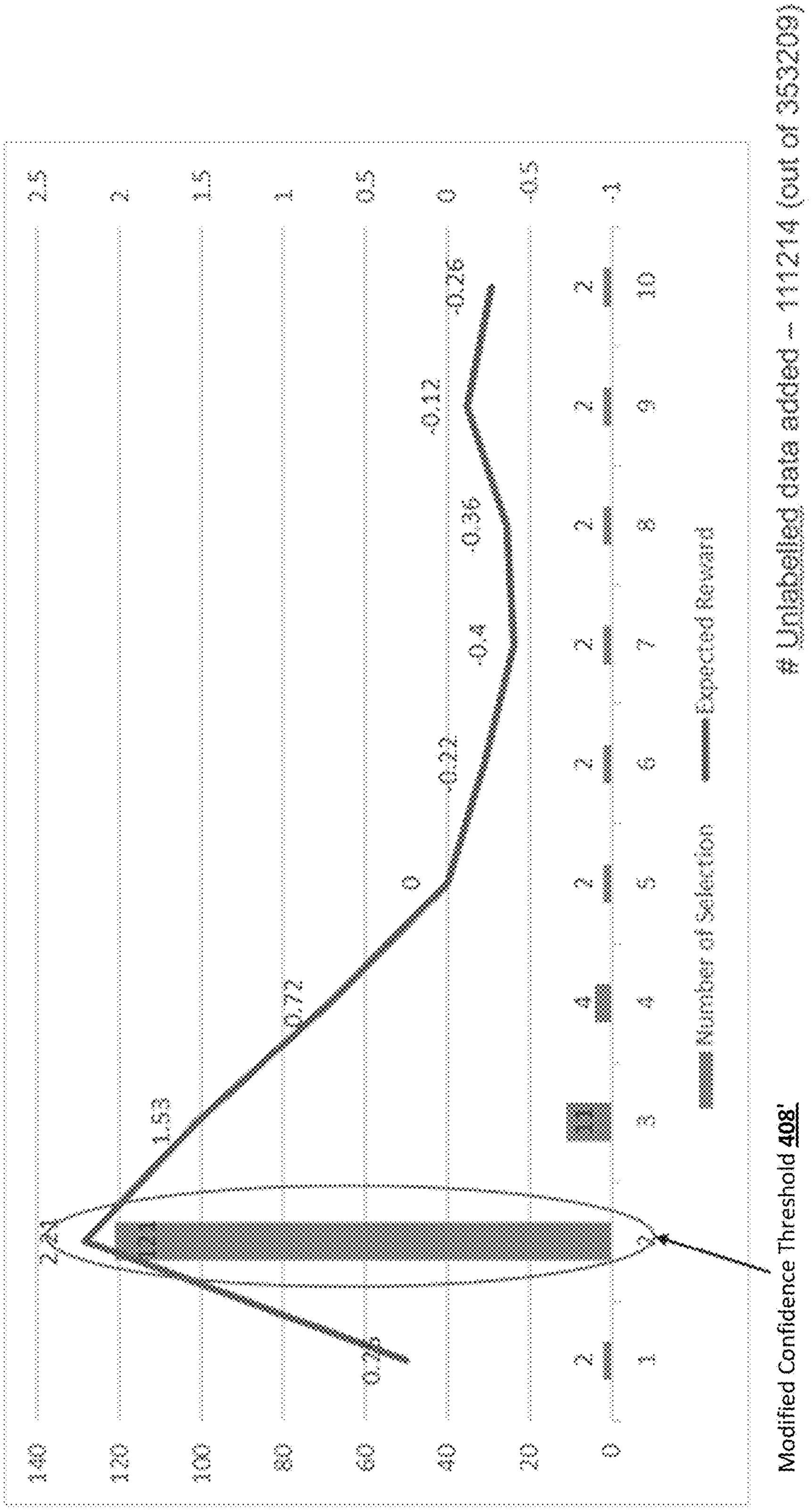
FIG. 6 provides example data associated with optimized reinforcement learning in accordance with one or more embodiments of the present disclosure.

FIG. 6 provides an example graph pattern 600 related to improved data labeling provided by the machine learning system 101, in accordance with one or more embodiments of the present disclosure. As illustrated in the graph pattern 600, the machine learning model 402 may maximize an expected reward for improved data labeling by utilizing the modified confidence threshold 408' and/or a related synthetic labeled dataset such as, for example, the synthetic labeled dataset 410. For instance, performance of the machine learning model 402 after one or more subsequent training stages with the synthetic labeled dataset 410 may result in improved accuracy for labeling, improved classifications for binary classification tasks, and/or an increase in an accuracy score for the machine learning model 402. In a non-limiting example, a number of synthetic labels included in the synthetic labeled dataset 410 may correspond to 111,214 labels out of a total of 353,209 labels in a training dataset.

Although certain techniques described herein for data labeling and/or training related to machine learning are explained with reference to performing classification data analysis, a person of ordinary skill in the relevant technology will recognize that the disclosed techniques have applications far beyond performing classification data analysis. As an illustrative example, the disclosed techniques may be used in various data visualization applications. As another illustrative example, the disclosed techniques may be used to encode data in data structures that facilitate at least one of data retrieval and data security. In some embodiments, the disclosed techniques may be used to generate video representations or other representations of categorical data (e.g., video representations that illustrate changes in the corresponding categorical data over time).

Machine Learning Actions and/or Visualizations

Figure 7:
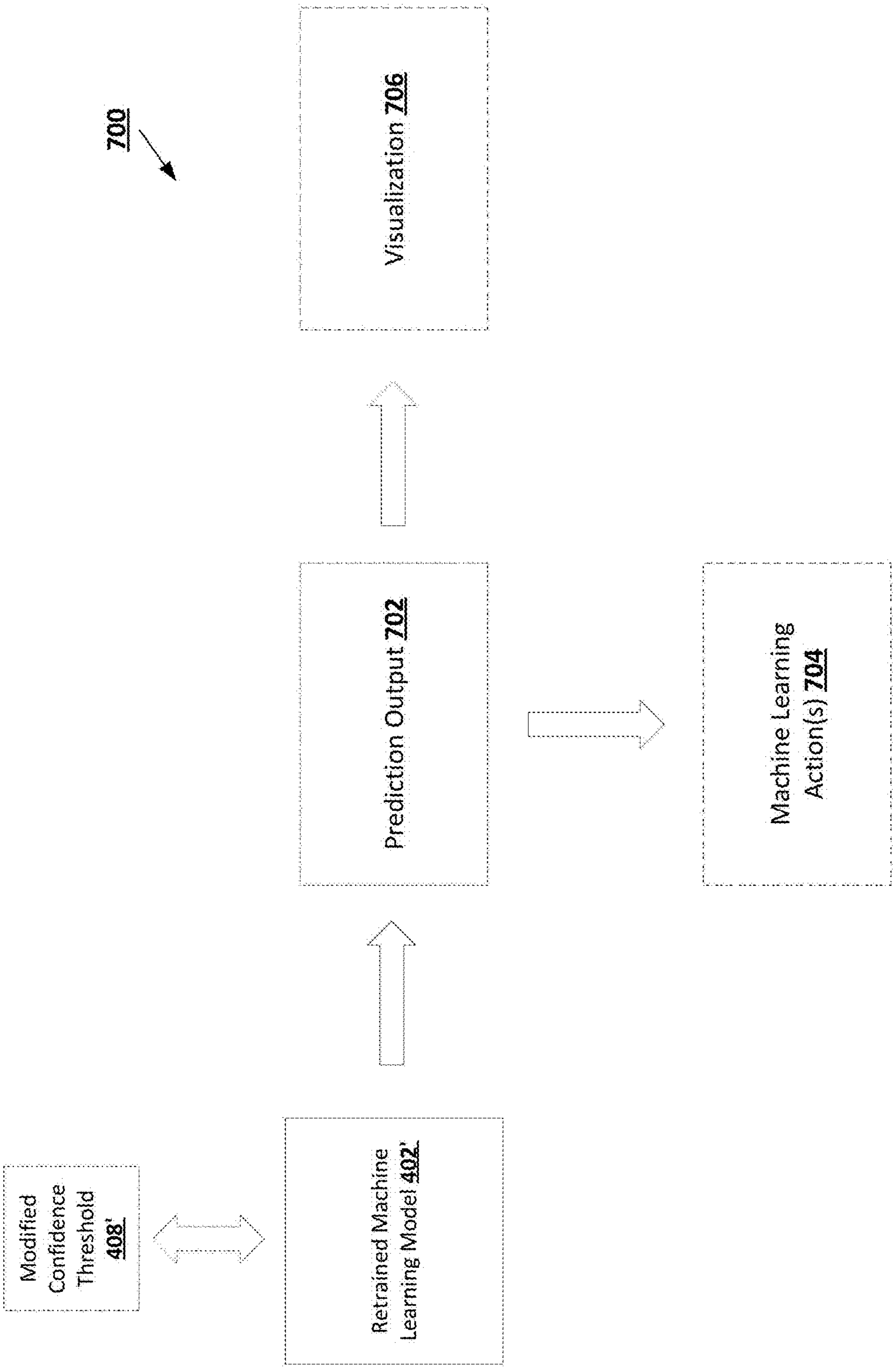
FIG. 7 provides an example computing system that provides for machine learning actions and/or visualizations in accordance with one or more embodiments of the present disclosure.

FIG. 7 provides an example computing system 700 that provides for machine learning actions and/or visualizations in accordance with one or more embodiments of the present disclosure. The computing system 700 includes the retrained machine learning model 402' associated with the modified confidence threshold 408'. In one or more embodiments, the retrained machine learning model 402' associated with the modified confidence threshold 408' is utilized to provide prediction output 702. The prediction output 702 may include one or more prediction insights, classifications, and/or inferences with respect to one or more data objects and/or features of one or more groupings of text, such as, one or more portions of a document. In certain embodiments, the prediction output 702 may include one or more labels for an updated training dataset for the retrained machine learning model 402'. In one or more embodiments, one or more machine learning actions 704 are performed based on the prediction output 702. For example, data associated with the prediction output 702 may be stored in a storage system, such as the storage subsystem 108 or another storage system associated with the machine learning system 101. The data stored in the storage system may be employed for reporting, decision-making purposes, operations management, healthcare management, and/or other purposes. In certain embodiments, the data stored in the storage system may be employed to provide one or more insights to assist with healthcare decision making processes, such as, clinical decisions during a clinical review of medical records or for identifying certain types of medical conditions or diseases such as particular type of rare disease. Additionally, or alternatively, the retrained machine learning model 402' may be further retrained based on the prediction output 702. For example, one or more relationships between features mapped in the retrained machine learning model 402' may be adjusted (e.g., refitted) based on data associated with the prediction output 702. In another example, cross-validation, hyperparameter optimization, and/or regularization associated with the retrained machine learning model 402' may be adjusted based on the prediction output 702. Additionally, or alternatively, a visualization 706 may be generated based on the prediction output 702. The visualization 706 may include, for example, one or more graphical elements for an electronic interface (e.g., an electronic interface of a user device) based on the prediction output 702.

It is to be appreciated that the prediction output 702 may additionally, or alternatively be employed for a number of additional applications. For example, Clinical Decision Support (CDS), Clinical Decisions for Fraud (CDF), automatic claim creation, and/or efficient auditing of payment integrity clinical review decisions may be integrated into the visualization 706. Accordingly, the prediction output 702 may be employed to improve efficiency and/or reduce waste in an adjudication process related to medical records. The prediction output 702 may also assist clinical reviewers with review of medical records by presenting relevant pages, as calculated by classifications for each claim line. In certain embodiments, the visualization 806 may include visual indicators (e.g., highlights) to indicate insights related to classification decisions (e.g., diagnosis decisions), as provided by the machine learning model 402. Additionally, or alternatively, the prediction output 702 and/or predictions (e.g., classifications) generated based on the prediction output 702 may be employed to identify potential issues and/or certain content within medical records, thus reducing a number of computing resources. Furthermore, the prediction output 702 and/or predictions (e.g., classifications) generated based on the prediction output 702 may additionally, or alternatively be employed to identify particular types of decisions by leveraging predicted qualities for different predictive codes with respect to classification decisions. In some embodiments, the visualization 706 may provide a clinical decision support user interface tool related to improve clinical review of medical records.

Figure 8:
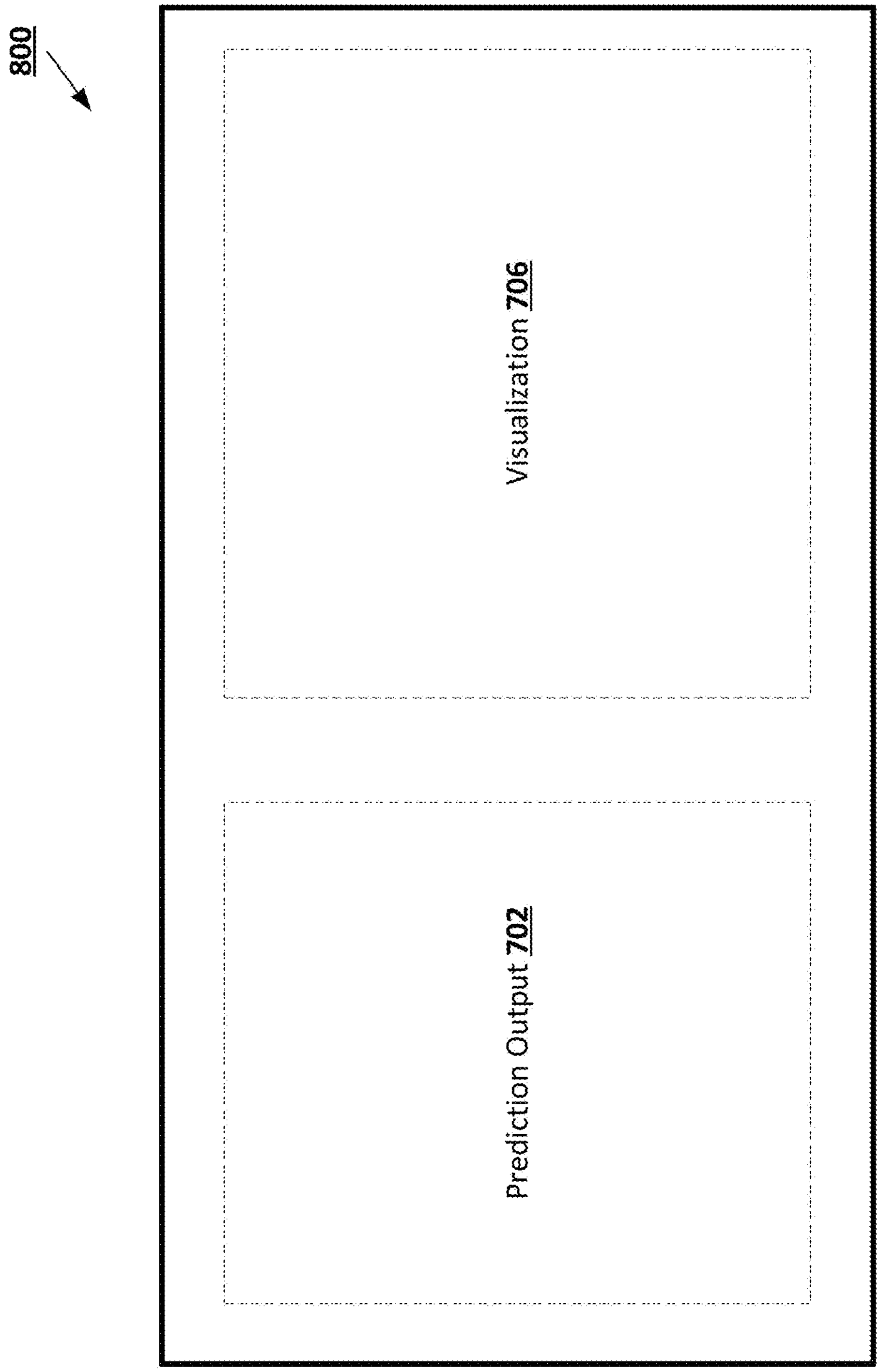
FIG. 8 provides an example user interface related to visualizations in accordance with one or more embodiments of the present disclosure.

FIG. 8 provides an example user interface 800 related to visualizations in accordance with one or more embodiments of the present disclosure. In one or more embodiments, the user interface 800 is, for example, an electronic interface (e.g., a graphical user interface) of the external computing entity 102. In various embodiments, the user interface 800 may be provided via the display 316 of the external computing entity 102. The user interface 800 may be configured to render the visualization 706. In various embodiments, the visualization 706 may provide a visualization of the prediction output 702 (e.g., one or more classification predictions such as one or more diagnosis predictions) for medical records and/or categorical data related to a patient. For example, the visualization 706 may render one or more visual elements related to the prediction output 702 from the retrained machine learning model 402' (e.g., one or more classification predictions such as one or more diagnosis predictions) for medical records and/or categorical data related to a patient. Additionally, in certain embodiments, the user interface 800 may be configured to render medical record data, and/or other data related to the visualization 706. The medical record data may provide textual information and/or visual information related to medical records and/or categorical data related to a patient. In various embodiments, the user interface 800 may be configured as a user interface (e.g., a clinical decision support user interface, a disease diagnosis support user interface, etc.) for clinical decision automation related to medical records and/or categorical data related to a patient.

Another operational example of prediction-based actions that may be performed based on prediction outputs comprise performing operational load balancing for post-prediction systems that perform post-prediction operations (e.g., automated specialist appointment scheduling operations) based on prediction outputs. For example, in some embodiments, a predictive recommendation computing entity determines D classifications for D prediction input data objects based on whether the selected region subset for each prediction input data object as generated by the predictive recommendation model comprises a target region (e.g., a target brain region). Then, the count of D prediction input data objects that are associated with an affirmative classification, along with a resource utilization ratio for each prediction input data object, may be used to predict a predicted number of computing entities needed to perform post-prediction processing operations with respect to the D prediction input data objects. For example, in some embodiments, the number of computing entities needed to perform post-prediction processing operations (e.g., automated specialist scheduling operations) with respect to D prediction input data objects may be determined based on the output of the equation:

$$R = \text{ceil}\left(\sum_{k}^{k=K} ur_k\right),$$

where R is the predicted number of computing entities needed to perform post-prediction processing operations with respect to the D prediction input data objects, ceil(.) is a ceiling function that returns the closest integer that is greater than or equal to the value provided as the input parameter of the ceiling function, k is an index variable that iterates over K prediction input data objects among the D prediction input data objects that are associated with affirmative classifications, and $ur_k$ is the estimated resource utilization ratio for a kth prediction input data object that may be determined based on a patient history complexity of a patient associated with the prediction input data object. In some embodiments, once R is generated, a predictive recommendation computing entity may use R to perform operational load balancing for a server system that is configured to perform post-prediction processing operations with respect to D prediction input data objects. This may be done by allocating computing entities to the post-prediction processing operations if the number of currently-allocated computing entities is below R, and deallocating currently-allocated computing entities if the number of currently-allocated computing entities is above R.

Reinforcement Learning for Machine Learning using Dynamic Confidence Thresholds

Figure 9:
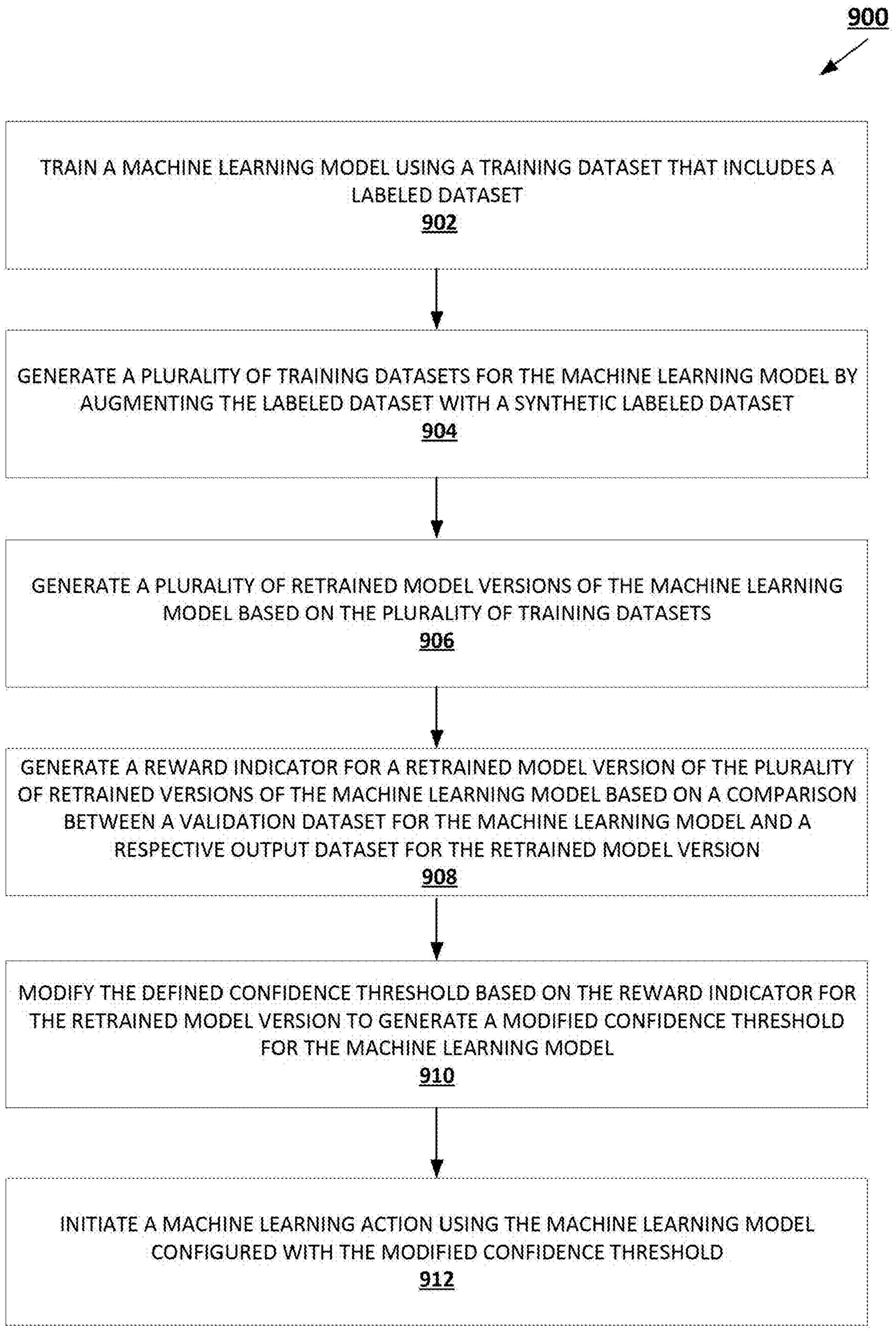
FIG. 9 is a flowchart diagram of an example process for providing reinforcement learning for machine learning using dynamic confidence thresholds in accordance with one or more embodiments of the present disclosure.

FIG. 9 is a flowchart diagram of an example process 900 for providing reinforcement learning for machine learning using dynamic confidence thresholds in accordance with one or more embodiments of the present disclosure. Via the various steps/operations of process 900, the machine learning computing entity 106 may process the training data 121, the confidence threshold data 122, and/or other data using one or more artificial intelligence techniques (e.g., one or more machine learning techniques) and/or one or more statistical techniques to provide improved prediction output. In doing so, the machine learning computing entity 106 may utilize machine learning solutions to infer important predictive insights, classifications, and/or inferences related to data.

The process 900 begins at step/operation 902 when the reinforcement learning engine 110 of the machine learning computing entity 106 trains a machine learning model using a training dataset that includes a labeled dataset.

At step/operation 904, the reinforcement learning engine 110 of the machine learning computing entity 106 generates a plurality of training datasets for the machine learning model by augmenting the labeled dataset with a synthetic labeled dataset.

At step/operation 906, the reinforcement learning engine 110 of the machine learning computing entity 106 generates a plurality of retrained model versions of the machine learning model based on the plurality of training datasets.

At step/operation 908, the reinforcement learning engine 110 of the machine learning computing entity 106 generates a reward indicator for a retrained model version of the plurality of retrained versions of the machine learning model based on a comparison between a validation dataset for the machine learning model and a respective output dataset for the retrained model version.

At step/operation 910, the reinforcement learning engine 110 and/or the MAB modeling engine 112 of the machine learning computing entity 106 modifies the defined confidence threshold based on the reward indicator for the retrained model version to generate a modified confidence threshold for the machine learning model.

At step/operation 912, the action engine 114 of the machine learning computing entity 106 initiates a machine learning action using the machine learning model configured with the modified confidence threshold.

In various embodiments, the step/operation 902, the step/operation 904, the step/operation 906, the step/operation 908, the step/operation 910, and/or the step/operation 912 may be repeated for each training dataset and/or machine learning model undergoing data labeling optimization.

Accordingly, as described above, various embodiments of the present disclosure address technical challenges related to accurately, efficiently, and/or reliably performing machine learning data analysis of complex data stored in data sources. For example, in various embodiments, proposed solutions provide improved data labeling for modeling using machine learning. In various embodiments, proposed solutions disclose classification predictions using machine learning. After the one or more machine learning models are generated, trained, and/or analyzed via the improved data labeling disclosed herein, the one or more machine learning models may be utilized to perform accurate, efficient, and reliable classification predictions. Accordingly, techniques that improve predictive accuracy without harming training speed, such as various techniques described herein, enable improving training speed given a constant predictive accuracy. Therefore, by improving accuracy of performing machine learning predictions, various embodiments of the present disclosure improve the training speed of machine learning frameworks.

VI. CONCLUSION

Many modifications and other embodiments will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

VII. EXAMPLES

Example 1. A computer-implemented method, the computer-implemented method comprising: generating, by one or more processors, a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold; generating, by the one or more processors, a plurality of retrained model versions of the machine learning model based on the plurality of training datasets; generating, by the one or more processors, a reward indicator for a retrained model version of the plurality of retrained versions of the machine learning model based on a comparison between a validation dataset for the machine learning model and a respective output dataset for the retrained model version; modifying, by the one or more processors and using a multi-armed bandit model, the defined confidence threshold based on the reward indicator for the retrained model version to generate a modified confidence threshold for the machine learning model; and initiating, by the one or more processors, the performance of the machine learning model based on the modified confidence threshold Example 2. The computer-implemented method of any of the preceding examples, further comprising generating the machine learning model by training the machine learning model based on (i) the labeled dataset and (ii) the validation dataset.

Example 3. The computer-implemented method of any of the preceding examples, further comprising generating the synthetic labeled dataset by applying the machine learning model to the unlabeled data.

Example 4. The computer-implemented method of any of the preceding examples, further comprising generating the defined confidence threshold based on a predefined performance metric.

Example 5. The computer-implemented method of any of the preceding examples, further comprising initiating the performance of the multi-armed bandit model based on a confidence threshold set that comprises a plurality of candidate confidence parameters for the machine learning model.

Example 6. The computer-implemented method of any of the preceding examples, further comprising initiating the performance of the multi-armed bandit model based on an upper confidence bound (UCB) prediction with respect to the respective reward indicators.

Example 7. The computer-implemented method of any of the preceding examples, wherein initiating the performance of the machine learning model comprises modifying one or more hyperparameter configurations of the machine learning model based on the modified confidence threshold.

Example 8. The computer-implemented method of any of the preceding examples, wherein initiating the performance of the machine learning model comprises initiating the performance of one or more prediction-based actions via the machine learning model and the modified confidence threshold.

Example 9. The computer-implemented method of any of the preceding examples, wherein initiating the performance of the machine learning model comprises generating one or more labels for a training dataset via the machine learning model and the modified confidence threshold.

Example 10. A computing apparatus comprising memory and one or more processors communicatively coupled to the memory, the one or more processors configured to generate a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold; generate a plurality of retrained model versions of the machine learning model based on the plurality of training datasets; generate a reward indicator for a retrained model version of the plurality of retrained versions of the machine learning model based on a comparison between a validation dataset for the machine learning model and a respective output dataset for the retrained model version; modify, using a multi-armed bandit model, the defined confidence threshold based on the reward indicator for the retrained model version to generate a modified confidence threshold for the machine learning model; and initiate the performance of the machine learning model based on the modified confidence threshold.

Example 11. The computing apparatus of any of the preceding examples, wherein the one or more processors are further configured to generate the machine learning model by training the machine learning model based on (i) the labeled dataset and (ii) the validation dataset.

Example 12. The computing apparatus of any of the preceding examples, wherein the one or more processors are further configured to generate the synthetic labeled dataset by applying the machine learning model to the unlabeled data.

Example 13. The computing apparatus of any of the preceding examples, wherein the one or more processors are further configured to generate the defined confidence threshold based on a predefined performance metric.

Example 14. The computing apparatus of any of the preceding examples, wherein the one or more processors are further configured to initiate the performance of the multi-armed bandit model based on a confidence threshold set that comprises a plurality of candidate confidence parameters for the machine learning model.

Example 15. The computing apparatus of any of the preceding examples, wherein the one or more processors are further configured to initiate the performance of the multi-armed bandit model based on an upper confidence bound (UCB) prediction with respect to the respective reward indicators.

Example 16. One or more non-transitory computer-readable storage media including instructions that, when executed by one or more processors, cause the one or more processors to: generate a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold; generate a plurality of retrained model versions of the machine learning model based on the plurality of training datasets; generate a reward indicator for a retrained model version of the plurality of retrained versions of the machine learning model based on a comparison between a validation dataset for the machine learning model and a respective output dataset for the retrained model version; modify, using a multi-armed bandit model, the defined confidence threshold based on the reward indicator for the retrained model version to generate a modified confidence threshold for the machine learning model; and initiate the performance of the machine learning model based on the modified confidence threshold.

Example 17. The one or more non-transitory computer-readable storage media of any of the preceding examples, wherein the instructions further cause the one or more processors to generate the synthetic labeled dataset by applying the machine learning model to the unlabeled data.

Example 18. The one or more non-transitory computer-readable storage media of any of the preceding examples, wherein the instructions further cause the one or more processors to generate the defined confidence threshold based on a predefined performance metric.

Example 19. The one or more non-transitory computer-readable storage media of any of the preceding examples, wherein the instructions further cause the one or more processors to initiate the performance of the multi-armed bandit model based on a confidence threshold set that comprises a plurality of candidate confidence parameters for the machine learning model.

Example 20. The one or more non-transitory computer-readable storage media of any of the preceding examples, wherein the instructions further cause the one or more processors to initiate the performance of the multi-armed bandit model based on an upper confidence bound (UCB) prediction with respect to the respective reward indicators.

The invention claimed is:

1. A computer-implemented method comprising:

generating, by one or more processors, a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold;

generating, by the one or more processors, a plurality of retrained model versions of the machine learning model based on the plurality of training datasets;

generating, by the one or more processors, a reward indicator for a retrained model version of the plurality of retrained model versions of the machine learning model based on a comparison between a validation dataset for the machine learning model and a respective output dataset for the retrained model version;

modifying, by the one or more processors and using a multi-armed bandit model, the defined confidence threshold based on the reward indicator for the retrained model version to generate a modified confidence threshold for the machine learning model; and initiating, by the one or more processors, the performance of the machine learning model based on the modified confidence threshold.

2. The computer-implemented method of claim 1, further comprising:

generating the machine learning model by training the machine learning model based on (i) the labeled dataset and (ii) the validation dataset.

3. The computer-implemented method of claim 1, further comprising:

generating the synthetic labeled dataset by applying the machine learning model to the unlabeled data.

4. The computer-implemented method of claim 1, further comprising:

generating the defined confidence threshold based on a predefined performance metric.

5. The computer-implemented method of claim 1, further comprising:

initiating the performance of the multi-armed bandit model based on a confidence threshold set that comprises a plurality of candidate confidence parameters for the machine learning model.

6. The computer-implemented method of claim 1, further comprising:

initiating the performance of the multi-armed bandit model based on an upper confidence bound (UCB) prediction with respect to the reward indicator.

7. The computer-implemented method of claim 1, wherein initiating the performance of the machine learning model comprises:

modifying one or more hyperparameter configurations of the machine learning model based on the modified confidence threshold.

8. The computer-implemented method of claim 1, wherein initiating the performance of the machine learning model comprises:

initiating the performance of one or more prediction-based actions via the machine learning model and the modified confidence threshold.

9. The computer-implemented method of claim 1, wherein initiating the performance of the machine learning model comprises:

generating one or more labels for a training dataset via the machine learning model and the modified confidence threshold.

10. A system comprising:

one or more processors; and one or more non-transitory computer readable media storing processor-executable instructions that, when executed by the one or more processors, cause the one or more processors to perform operations comprising:

generating a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold;

generating a plurality of retrained model versions of the machine learning model based on the plurality of training datasets;

generating a reward indicator for a retrained model version of the plurality of retrained model versions of the machine learning model based on a comparison between a validation dataset for the machine learning model and a respective output dataset for the retrained model version;

modifying, using a multi-armed bandit model, the defined confidence threshold based on the reward indicator for the retrained model version to generate a modified confidence threshold for the machine learning model; and initiating the performance of the machine learning model based on the modified confidence threshold.

11. The system of claim 10, wherein the processor-executable instructions, when executed by the one or more processors, further cause the one or more processors to perform operations comprising:

generating the machine learning model by training the machine learning model based on (i) the labeled dataset and (ii) the validation dataset.

12. The system of claim 10, wherein the processor-executable instructions, when executed by the one or more processors, further cause the one or more processors to perform operations comprising:

generating the synthetic labeled dataset by applying the machine learning model to the unlabeled data.

13. The system of claim 10, wherein the processor-executable instructions, when executed by the one or more processors, further cause the one or more processors to perform operations comprising:

generating the defined confidence threshold based on a predefined performance metric.

14. The system of claim 10, wherein initiating the performance of the machine learning model comprises:

initiating the performance of the multi-armed bandit model based on a confidence threshold set that comprises a plurality of candidate confidence parameters for the machine learning model.

15. The system of claim 10, wherein initiating the performance of the machine learning model comprises:

initiating the performance of the multi-armed bandit model based on an upper confidence bound (UCB) prediction with respect to the reward indicator.

16. One or more non-transitory computer-readable storage media storing processor-executable instructions that, when executed by one or more processors, cause the one or more processors to perform operations comprising:

generating a plurality of training datasets for a machine learning model by augmenting a labeled dataset for the machine learning model with a synthetic labeled dataset that (i) is related to unlabeled data and (ii) comprises one or more data inferences by the machine learning model that satisfy a defined confidence threshold;

generating a plurality of retrained model versions of the machine learning model based on the plurality of training datasets;

generating a reward indicator for a retrained model version of the plurality of retrained model versions of the machine learning model based on a comparison between a validation dataset for the machine learning model and a respective output dataset for the retrained model version;

modifying, using a multi-armed bandit model, the defined confidence threshold based on the reward indicator for the retrained model version to generate a modified confidence threshold for the machine learning model; and initiating the performance of the machine learning model based on the modified confidence threshold.

17. The one or more non-transitory computer-readable storage media of claim 16, wherein the processor-executable instructions, when executed by the one or more processors, further cause the one or more processors to perform operations comprising:

generating the synthetic labeled dataset by applying the machine learning model to the unlabeled data.

18. The one or more non-transitory computer-readable storage media of claim 16, wherein the processor-executable instructions, when execute by the one or more processors, further cause the one or more processors to perform operations comprising:

generating the defined confidence threshold based on a predefined performance metric.

19. The one or more non-transitory computer-readable storage media of claim 16, wherein initiating the performance of the machine learning model comprises:

initiating the performance of the multi-armed bandit model based on a confidence threshold set that comprises a plurality of candidate confidence parameters for the machine learning model.

20. The one or more non-transitory computer-readable storage media of claim 16, wherein initiating the performance of the machine learning model comprises:

initiating the performance of the multi-armed bandit model based on an upper confidence bound (UCB) prediction with respect to the reward indicator.

* * * * *